United States Patent
Brown et al.

(10) Patent No.: US 10,423,600 B2
(45) Date of Patent: Sep. 24, 2019

(54) LOW LATENCY QUERY PROCESSING OVER A SERIES OF REDO RECORDS

(71) Applicant: Oracle International Corporation, Redwood Shores, CA (US)

(72) Inventors: Archie Williams Brown, Milford, NH (US); Douglas Andrew Voss, Nashua, NH (US); Joydip Kundu, Nashua, NH (US); Parthasarathy Elangadu Raghunathan, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 343 days.

(21) Appl. No.: 15/268,008

(22) Filed: Sep. 16, 2016

(65) Prior Publication Data

US 2018/0081922 A1    Mar. 22, 2018

(51) Int. Cl.
*G06F 16/00* (2019.01)
*G06F 16/22* (2019.01)
*G06F 16/2455* (2019.01)
*G06F 16/27* (2019.01)

(52) U.S. Cl.
CPC ...... *G06F 16/2282* (2019.01); *G06F 16/2455* (2019.01); *G06F 16/24568* (2019.01); *G06F 16/27* (2019.01)

(58) Field of Classification Search
CPC .. G06F 11/20; G06F 11/2023; G06F 11/2025; G06F 11/2028; G06F 11/2097; G06F 17/30368; G06F 11/1471; G06F 17/30477; G06F 16/2358; G06F 16/27; G06F 16/24568
See application file for complete search history.

(56) References Cited

U.S. PATENT DOCUMENTS

| | | | |
|---|---|---|---|
| 7,222,136 B1 | 5/2007 | Brown et al. | |
| 7,236,993 B2 | 6/2007 | Brown et al. | |
| 7,287,034 B2 | 10/2007 | Wong et al. | |
| 7,734,580 B2 * | 6/2010 | Lahiri | G06F 11/2035 707/609 |
| 7,890,466 B2 * | 2/2011 | Kundu | G06F 16/2358 707/648 |
| 8,880,480 B2 | 11/2014 | Kundu et al. | |
| 9,280,591 B1 * | 3/2016 | Kharatishvili | G06F 16/27 |
| 9,298,564 B2 | 3/2016 | Lee et al. | |

(Continued)

*Primary Examiner* — Merilyn P Nguyen
(74) *Attorney, Agent, or Firm* — Vista IP Law Group LLP (57) ABSTRACT

Systems for high-performance, low-latency database log mining applications. A method commences upon receiving a log mining query. The query specifies desired results that correspond to a prior logical state of the database system. A first type of processing entity is invoked to process contents of the redo stream by loading metadata into a data dictionary, and a second type of processing entity is invoked to construct metadata from the redo stream, wherein the constructed metadata pertains only database objects referenced in the query. During the time that the first type of processing entity is processing contents of the redo stream by loading metadata into a data dictionary, a process of a second type serves incoming queries using a subset of entries in the redo stream. When the data dictionary is completed, a switchover point is reached and thenceforth, incoming queries are served using the first type of processing entity.

20 Claims, 8 Drawing Sheets

(56) References Cited

U.S. PATENT DOCUMENTS

| | | | | |
|---|---|---|---|---|
| 2004/0030954 A1* | 2/2004 | Loaiza | ............... | G06F 16/2358 |
| | | | | 714/20 |
| 2006/0155915 A1* | 7/2006 | Pereira | ................... | H04L 45/00 |
| | | | | 711/100 |
| 2007/0198700 A1* | 8/2007 | Vivian | ............... | G06F 11/2097 |
| | | | | 709/224 |

* cited by examiner

LOW LATENCY QUERY PROCESSING OVER A SERIES OF REDO RECORDS

BACKGROUND

In modern relational database management systems (RDBMS), modifications to the database are logged into a redo stream made up of redo records. This redo stream can be used to service log-mining and other applications so as to provide a variety of functionality. For example, the redo stream can be used to construct a standby database, in which a standby database shadows a primary database by extracting committed transactions out of the redo stream and "redo-ing" or otherwise applying those transactions to a standby instance. As another example, the redo stream can be used to provide log-based replication, in which a replica site extracts committed changes made to the tables of interest in the database and applies the changes to the replica in order to keep the replica tables synchronized. As yet another example, the redo stream can be used to provide user query functionality, in which the redo stream is queried as though it were a relational database.

In many cases, in order to interpret a redo record (e.g., change records), a data dictionary is needed. Over time, a database undergoes changes (e.g., resulting from an operation to add a column to a table, or to change a data format, etc.) and such changes are captured in a redo log. For example, a redo log might capture all data definition commands as well as all data manipulation commands from the period January 1 through March 30. In order to process the full range of log mining queries that pertain to the database contents as of February 14, the data dictionary that was then-current as of February 14 would need to be constructed.

A data dictionary can be constructed by determining an initial state of the database (e.g., as was then-current as of a moment just prior to a redo log entry) and then applying the exact sequence of redo log entries through to at least the February 14 time marker in the redo log. In this manner, a data dictionary can be generated and then used to process log mining queries that pertain to particular database object contents as of February 14. Using the same redo log, a fully completed data dictionary can be generated to cover all objects in the database over all time covered by the redo log. Such a complete data dictionary can in turn be used to process the full range of log mining queries that pertain to the database contents through the full range of dates that bound the redo log.

Unfortunately, the processing time (e.g., latency) needed to read in an initial state of a subject database and to then apply the exact sequence of redo log entries from the tine of the initial state through to a particular moment in time can become long, especially in situations when the redo log is especially large, or has an especially large number of database objects and/or when a large number of redo log entries are to be applied. The latency experienced by the log-mining user before the log-mining user can receive results of a first query can be long. Techniques are needed to reduce this latency.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The drawings described below are for illustration purposes only. The drawings are not intended to limit the scope of the present disclosure.

DETAILED DESCRIPTION

Some embodiments of the present disclosure address the problem of reducing processing latency when processing a query over a redo log. The accompanying figures and discussions herein present example environments, systems, methods, and computer program products for providing a lower latency processing option when performing data dictionary reconstruction using a series of redo records.

Overview

The process of mining database redo records (e.g., processing a query over a stream of historical redo log records) manipulates metadata that describes the objects being queried. The metadata needs to have sufficient specificity and currency to be able to complete the query and return query results to the requestor. A complete representation of the subject database can be constructed by successively applying database redo records to a snapshot of the database, however the elapsed time needed to build such a complete representation of the subject database can become long. A user or process running a log mining application might have to wait for an appreciable amount of time while the data dictionary is being built.

A lower latency way is to invoke a process that does not rely on a completed data dictionary, and instead builds metadata having sufficient specificity and currency so as to satisfy a particular query (e.g., a query that pertains to only a subset of database objects). In one embodiment, a historical query processor that constructs only the subset of metadata actually needed to satisfy the query is deployed in parallel with the processing to build a complete data dictionary. In many or most situations, the historical query processor might present a significant demand for computing resources so as to compute the metadata actually needed so as to satisfy the query. Effects stemming from the high demand for computing resources is seen to be an acceptable tradeoff when compared to the effects stemming from the long latency that is incurred while waiting for the entire data dictionary to be built.

Running a historical query processor in parallel with constructing the entire data dictionary results in certain desired performance characteristics: (1) during an initial start-up period, a log mining query can be satisfied with low latency by using the historical query processor, and (2) since the data dictionary will eventually be completed, then at that switchover point, the data dictionary can be used to satisfy log mining queries with a lower resource demand than was demanded by the historical query processor.

Two Regimes with a Switchover Point Occurring at Data Dictionary Completion

In processing an incoming query (e.g., from a log-mining application), one regime relies on the full data dictionary as would have been current at the time that the incoming query pertains to. For example, a query, "What were the highest recorded mid-day temperatures as of July 2015 in Austin and Boston" can be satisfied given both (1) the data tables pertaining to Austin and Boston and their values as of that day, and (2) the metadata pertaining to the two tables such that the tables can be accessed, combined, joined or otherwise manipulated so as to satisfy the query. As mentioned above, this regime can be applied once the full data dictionary has been constructed.

Prior to entering this regime, however a "fast start" query processing regime can be observed so as to quickly satisfy incoming log mining queries (although at greater computing resource expense). At some point in time, construction of the data dictionary will have been completed. At that point in time there can be a switchover from the regime that uses the fast start" query processing techniques to a second regime that processes queries using the completed data dictionary. After switchover, ongoing operation under the second regime can persist, and reliance on the fast start query processing techniques are no longer needed or desired, (1) since the full data dictionary is available, and (2) since the fast start query processing techniques consume more computing resources than the full data dictionary techniques. After the switchover point, any processes involved in fast start query processing can terminate and release resources.

In some database systems, the aforementioned fast start query processing technique can be implemented using a historical data query processor. A historical data query processor obtains just the needed metadata (e.g., metadata pertaining to just the objects in the query) that is constructed on-the-fly—even in the absence or incompleteness of a data dictionary. Often, the historical data query processor can return query results before the full data dictionary has been constructed since the quantity of metadata used by a historical data query processor is often much smaller than the quantity of metadata needed for all objects in a subject database.

The Fast Start Technique May Pend on Some Queries

As is further disclosed hereunder, a historical data query processor processes queries so as to achieve fast start characteristics (e.g., low latency), while a data dictionary builder continues to build the full data dictionary. In some situations, the ability of a historical data query processor to deliver query results can be limited by the amount of undo metadata retained by the source database (e.g., the undo retention metadata might cover only a certain amount of time). In such a case, the historical data query processor might pend before completion (e.g., without returning results to the requestor) until the moment of switchover, and then pass the pending query to a process that uses the full data dictionary to return query results to the requestor.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Example Embodiments

Figure 1A:
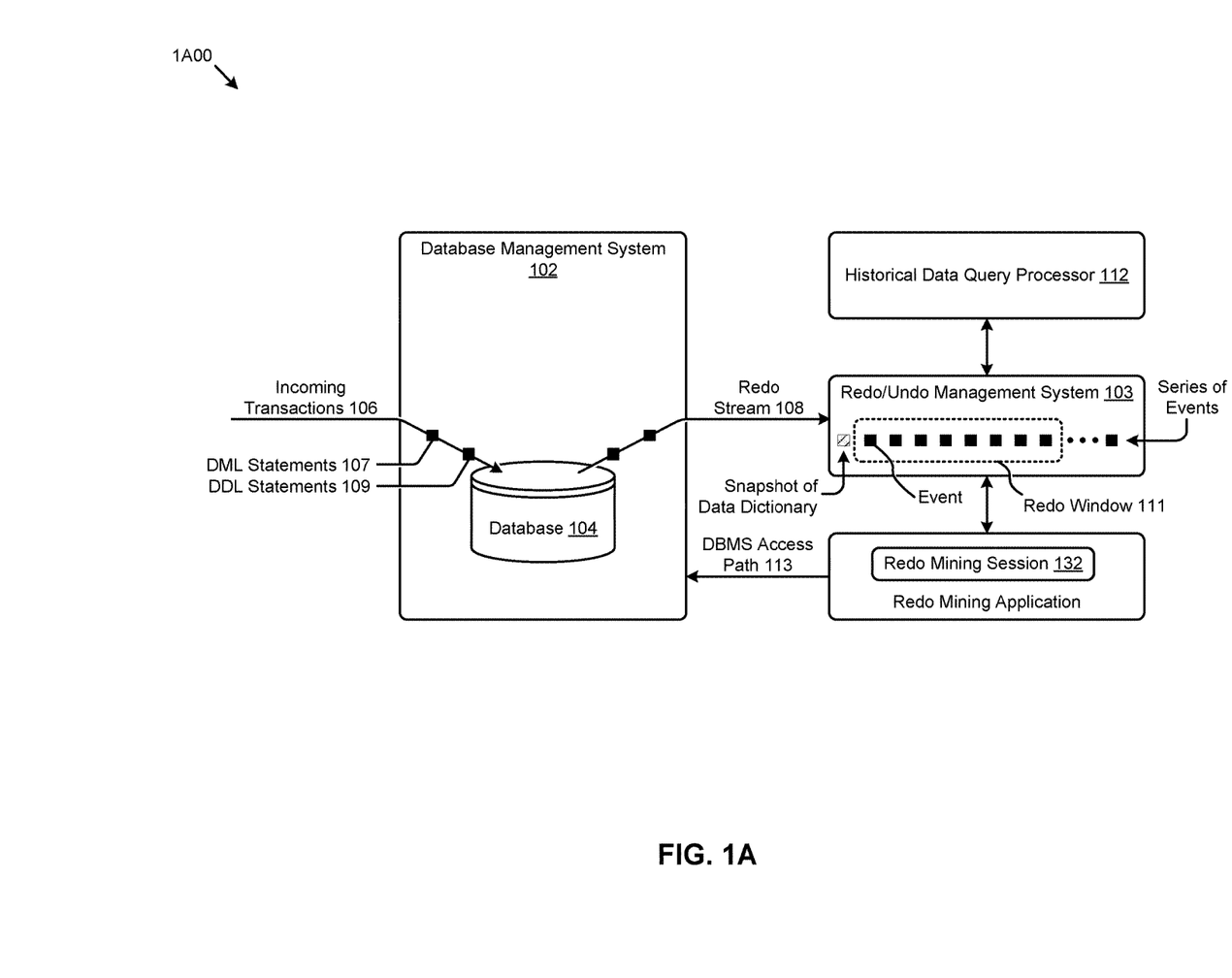
FIG. 1A exemplifies a database redo stream processing system.

FIG. 1A exemplifies a database redo stream processing system 1A00. As an option, one or more variations of database redo stream processing system 1A00 or any aspect thereof may be implemented in the context of the architecture and functionality of the embodiments described herein. The database redo stream processing system 1A00 or any aspect thereof may be implemented in any environment.

The shown database management system 102 receives incoming transactions 106 such as in the form of data manipulation statements (e.g., DML statements 107) and data definition statements (e.g., DDL statements 109). Such transactions are processed by the database management system 102, which processing can cause changes to the database 104. Any or all of the transactions (e.g., DML statements 107 and/or DDL statements 109) are forwarded in a stream of statements (e.g., redo stream 108). As is applicable in database management systems such as database management system 102, the redo stream is time-ordered. An incoming DDL will be timestamped at the time it is received for processing. A later-timestamped DML can be imputed to pertain to the data dictionary as of the earlier-timestamped DDL.

A stream of statements can be received by a redo/undo management system 103 which in turn persists received statements in a series of redo records. In some cases, the series of redo/undo records are persisted indefinitely. In other cases the series of redo/undo records are persisted only for a given time period.

The redo/undo management system 103 provides access (e.g., through an application programming interface) such that a redo/undo mining session 132 can perform queries over the redo records in the redo window 111. The redo/undo mining session 132 can access metadata pertaining to the database 104 over the shown DBMS access path 113.

The redo/undo management system 103 also provides access (e.g., through the same or separate application programming interface) such that a historical data query processor 112 can perform queries over the redo/undo records in the redo window 111. In exemplary cases, the historical data query processor 112 does not have access to the source database (e.g., database 104). However, even in such a scenario, the historical data query processor 112 has the capability of constructing metadata from the redo records that are available in the redo window 111.

Use Models

In one use model, the analysis of data manipulation statements in a redo-stream are interpreted or otherwise analyzed with respect to a set of metadata that corresponds to the particular data manipulation statement being analyzed. If the time period covered by the redo window 111 includes data definition commands that change the metadata, then the semantics of the changed metadata needs to be considered when interpreting data manipulation statements that were logged after the metadata was changed. For example if a table initially was composed of two columns, and at some moment thereafter, the metadata was changed to reflect a three column-table, then log entries that correspond to subsequently-issued DMLs are to be interpreted with respect to the three-column table.

A redo log window is finite. A redo log might only comprise log entries that had occurred over some finite period of history. It is possible that a redo log would contain data manipulation statements that pertain to both an earlier schema (e.g., the aforementioned two-column table) as well as data manipulation statements that pertain to a later-defined schema (e.g., the aforementioned three-column table). Depending on when the finite period of history begins, the redo log might not contain the combination of earlier issued data manipulation statements as well as the data definition commands that were processed to form the earlier data dictionary (e.g., the two-column table schema). In the full data dictionary processing regime, in order to interpret the older data manipulation statements, a data dictionary needs to be constructed from a respective series of log entries. As earlier discussed, a complete data dictionary pertaining to a database might subsume many hundreds or thousands (or more) of database objects. Accordingly, a reconstruction process of a data dictionary for a database that comprises many hundreds or thousands (or more) of database objects can require a large amount of elapsed time.

Further details regarding a general approach to generating and maintaining data dictionaries are described in U.S. Pat. No. 7,236,993, which is hereby incorporated by reference in its entirety.

Figure 1B:
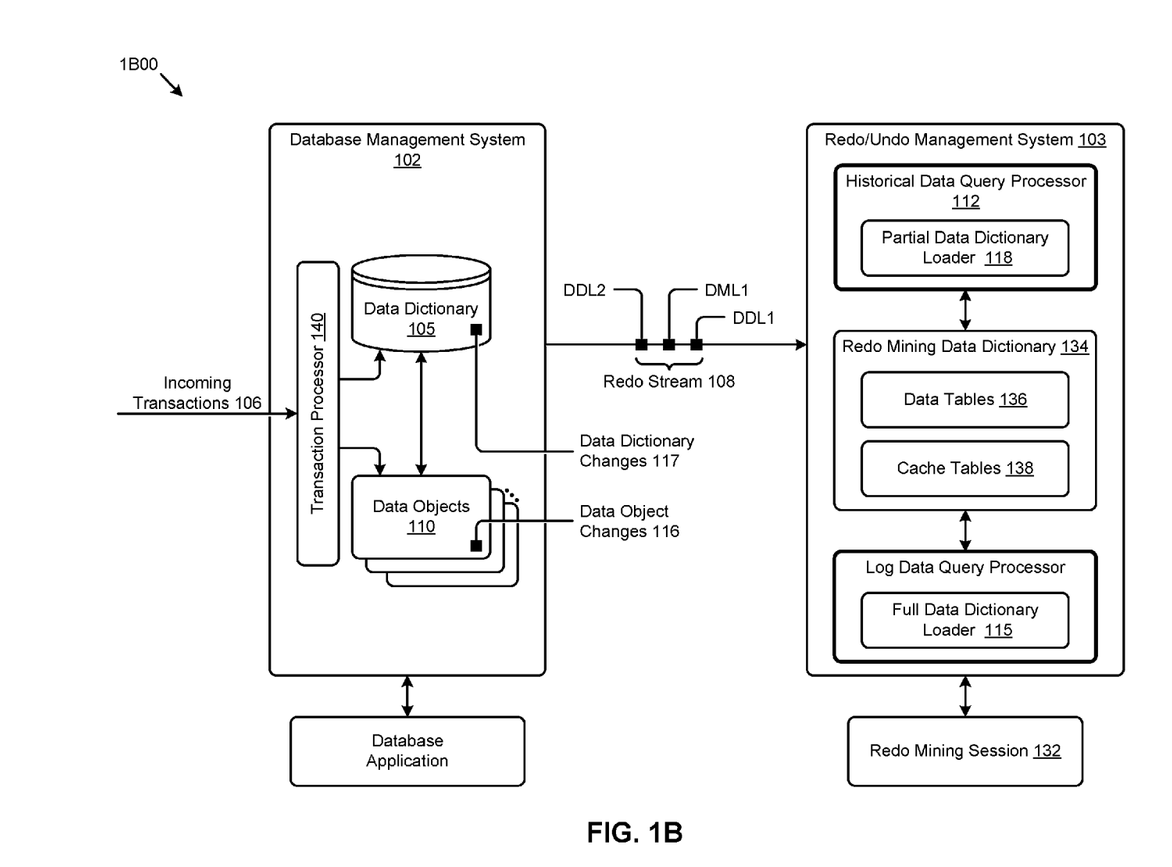
FIG. 1B exemplifies a fast start redo stream processing system showing two types of query processes that independently process a series of redo records, according to an embodiment.

Client applications that rely on the results of processing a redo log might need results faster than as can be provided by the aforementioned full data dictionary regime. The following FIG. 1B shows techniques that serve to reduce latency (e.g., time lag) between a client application's request and the time that the request can be satisfied. Several variations of such techniques are presented as shown and described in FIG. 1B.

FIG. 1B exemplifies a fast start redo stream processing system 1B00 showing data dictionary reconstruction using a series of redo records. As an option, one or more variations of fast start redo stream processing system 1B00 or any aspect thereof may be implemented in the context of the architecture and functionality of the embodiments described herein. The fast start redo stream processing system 1B00 or any aspect thereof may be implemented in any environment.

The embodiment shown in FIG. 1B includes the database management system 102 as introduced in FIG. 1A. The embodiment further includes a transaction processor 140 that interprets incoming DDLs and DMLs so as to apply their semantics to a data dictionary (e.g., data dictionary 105) such as the shown data dictionary changes 117 and/or to data objects 110 such as the shown data object changes 116. When enabled, the incoming transactions and/or their constituent DMLs and/or DDLs are output in a time-ordered series. The time-ordered series is received by a redo/undo management system 103. Strictly as an example for discussion, the redo stream 108 might comprise a first data definition command (e.g., DDL1) followed by a first data manipulation command (e.g., DML1), followed by a second data definition command (e.g., DDL2), possibly followed by a second data manipulation command. The first data manipulation command (DML1) is interpreted at least in part on the basis of the first data definition command (DDL1). Subsequent data manipulation commands are interpreted at least in part on the basis of the first data definition command, as well as on the basis of the first data manipulation command, and so on. A particular data definition command and/or a particular data manipulation command might pertain to just one (or a small set) of the data objects 110. In the embodiment shown, a historical data query processor 112 is provided so as to process queries over the redo log "as if" the query were being processed by the database management system 102. In some cases a query coming into the historical data query processor 112 involves only one object or a small set of objects, and the metadata needed for processing the incoming query can be processed quickly (e.g., by the partial data dictionary loader 118). While such a historical data query processor can, in some cases, return query results very quickly, the process of constructing a partial data dictionary is more compute intensive than looking up the needed metadata from a data dictionary—if such a data dictionary were available at that time.

Further details regarding a general approach to historical data query processing are described in U.S. Pat. No. 7,689,549, which is hereby incorporated by reference in its entirety.

The shown redo mining data dictionary 134 is composed of data tables 136 and cache tables 138. The cache tables are constructed during operation of a full data dictionary loader 115 and/or during operation of the partial data dictionary loader 118. In addition, the cache tables may be populated in conjunction with metadata fetches from the data tables. A cache table might be accessed in conjunction with the processing of redo records that alter the data tables in a manner that would necessitate access to or capture of a prior historical state. When the full data dictionary construction is complete, it can be used to efficiently process any query over any object referenced in the redo window.

Data Dictionary Starting Point

Prior to commencement of the construction of a data dictionary that contains the metadata needed to serve data mining queries, a versioned snapshot of metadata is identified or constructed, and may be brought in whole or part into one or more cache tables, thus providing access to historical metadata. This snapshot technique ensures that appropriately versioned, correct metadata is available as a starting point. In other situations (e.g., when the source database is available and historical metadata is not required), the mining engine might instead query the source database's data dictionary for needed metadata. Both the mining engine and any clients can obtain accurate and current metadata by first querying the cache tables, then, if the required version of the metadata is not found, by querying over the data dictionary contents (e.g., using a lookback query mechanism).

Further details regarding a general approach to obtaining a versioned snapshot of metadata are described in U.S. Pat. No. 7,222,136, which is hereby incorporated by reference in its entirety.

Cache Table Uses

Metadata (e.g., or any other aspects of the redo log records) can be written into the cache tables. As examples, (1) when metadata is fetched from data tables a representation with a version stamp would be written to a cache table, and (2) when an action over the subject database is mined from the redo log, the action and/or its metadata can be written both to the data table as well as to a cache table so as to be easily available for subsequent fetches. There are several different types of metadata fetches. As examples, there are fetches of table attributes, with or without including or excluding column metadata, and there are fetches of a table's columns and respective column attributes. The disclosed systems support fetches of any type or types of metadata. In some embodiments, each type of metadata fetch has respective cache table.

In addition to the cache table uses listed above, some embodiments in accordance with this disclosure also implement a pre-fetch capability. The pre-fetch capability relies in part on a rule or regime whereby all types of metadata associated with a given object other aspects of the redo log records are prospectively fetched from the data tables and written to corresponding cache tables. At a future moment, when an action and its metadata is mined from the redo log such that it would be brought into the data tables, prospectively, it is first written to the cache table with a timestamp. As such, after the mined action and its metadata has been brought into the data tables, a subsequent metadata fetch from the data tables would result in the most recently captured version of the object's metadata also being captured into all of the cache tables.

This pre-caching regime supports embodiments where a process requiring log mining metadata can be granted access to the cache tables, even without access the data tables. As used by log mining clients discussed herein, some of the log mining clients need only access the cache tables (and do not need to access the source database's data dictionary).

As can be understood, there are some cases when the historical data query processor can return results sooner than waiting for completion of the population of the full data dictionary. The time differential is sufficiently large so as to support the definition of, and adherence to, two regimes when processing incoming queries.

Figure 1C:
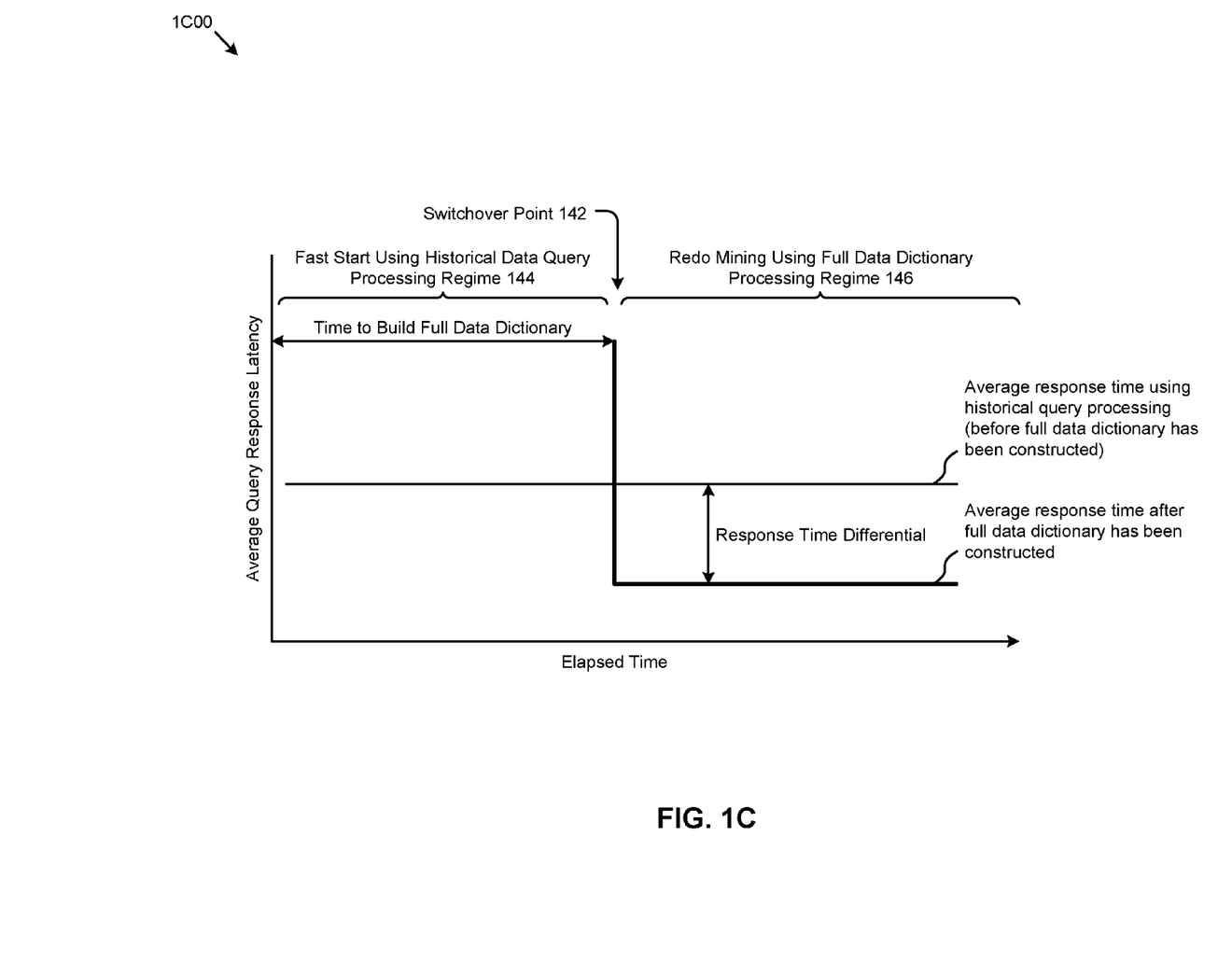
FIG. 1C is a comparison chart showing response time differential exhibited by different query processing techniques, according to some embodiments.

FIG. 1C is a comparison chart 1C00 showing response time differential exhibited by different query processing techniques. As an option, one or more variations of comparison chart 1C00 or any aspect thereof may be implemented in the context of the architecture and functionality of the embodiments described herein. The comparison chart 1C00 or any aspect thereof may be implemented in any environment.

The embodiment shown in FIG. 1C depicts a two-variable plot having an ordinate of average query response latency as a function of a time period. Two regimes are depicted: (1) the first regime is depicted as the time period from the origin to the time it takes to rebuild the full data dictionary and, (2) a second regime depicted as the time period after the full data dictionary has been constructed. In operation, a system might initially observe the shown fast start using historical data query processing regime 144, and then, upon detection of a switchover point 142, the system might thereafter observe the shown redo mining using full data dictionary processing regime 146. In the earlier regime, query results are returned to the requesting application sooner than waiting for completion of the full dictionary rebuild. However, in the later regime the faster response time using the full data dictionary is preferred over the flashback technique.

Figure 2:
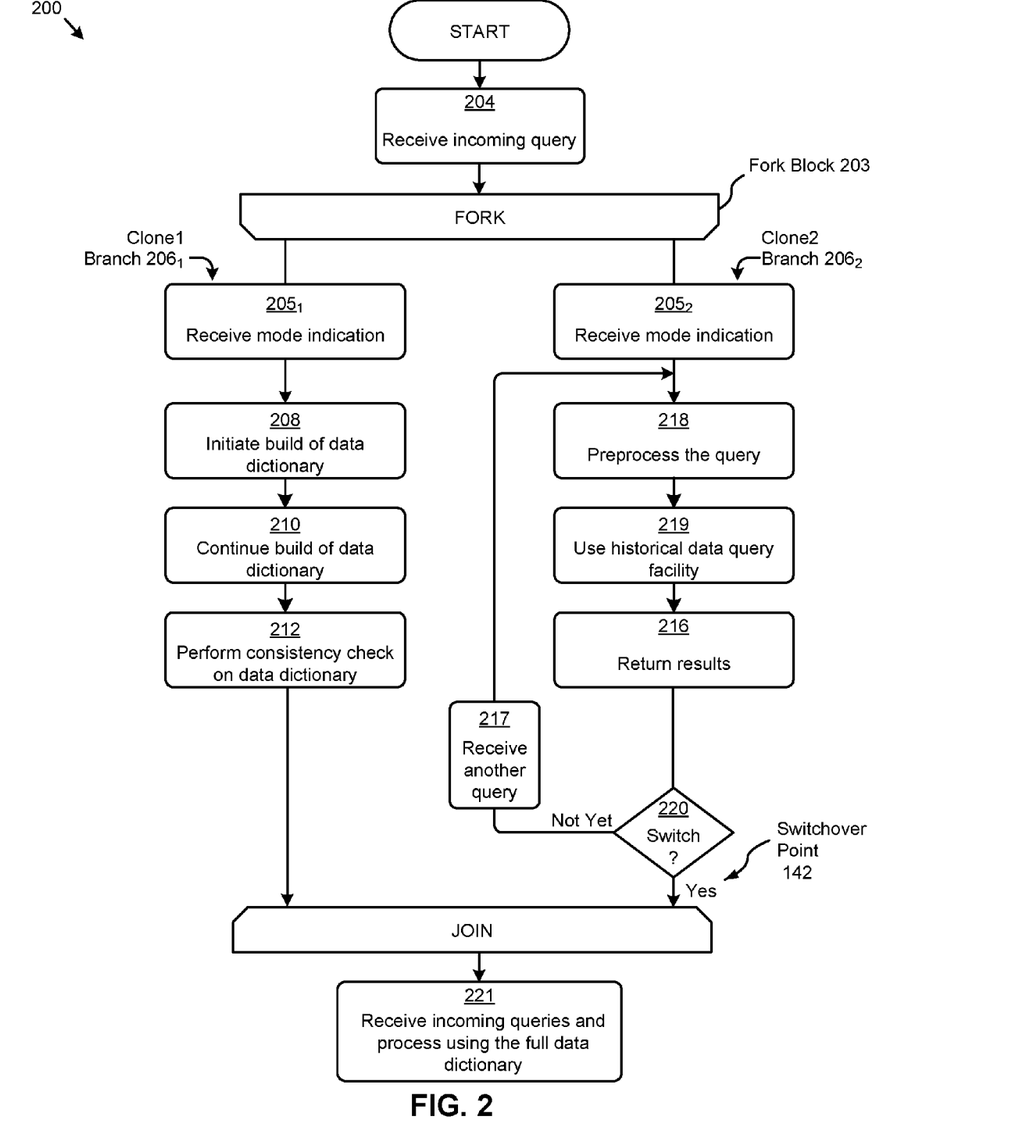
FIG. 2 depicts a process cloning technique used for launching two or more different query processing techniques over a series of redo records, according to some embodiments.

FIG. 2 depicts a process cloning technique 200 used for launching two or more different query processing techniques over a series of redo records. As an option, one or more variations of process cloning technique 200 or any aspect thereof may be implemented in the context of the architecture and functionality of the embodiments described herein. The process cloning technique 200 or any aspect thereof may be implemented in any environment.

The embodiment shown in FIG. 2 starts upon receiving an incoming query 204 (e.g., from a redo mining session 132). A fork block 203 is entered that identifies a process code base that can be cloned into two (or more) concurrently running processes or threads. As shown pertaining to clone1 branch $206_1$, the clone1 receives a mode indication $205_1$ (e.g., from a passed-in parameter, or from a file, or from an inter-process communication, etc.). This clone1 branch $206_1$ depicts the mode that builds the full data dictionary beginning at step 208 that initiates building of the full data dictionary. Building of the full data dictionary continues at step 210.

Meanwhile, and as shown, and as pertaining to the clone2 branch $206_2$, the clone2 receives a mode indication $205_2$ (e.g., from a passed-in parameter, or from a file, or from an inter-process communication, etc.). This clone2 branch $206_2$ depicts the mode that performs historical data query processing. Specifically, at step 218, the incoming query is preprocessed (e.g., to determine the objects referenced directly or indirectly by the query) and then processing advances to step 219 so as to use a historical data query facility. In step 216 the historical data query facility might be able to return results. However, in some cases the historical data query facility might not be able to return results pertaining to the query, and instead an error condition is raised. In such a case, the clone stalls and the query would later be satisfied by the processing under the full data dictionary processing regime.

Continuing this discussion, the processing along clone1 branch $206_1$ might be approaching step 212 where a consistency check of the full data dictionary is performed. During the time duration that step 208, step 210, and step 212 are being performed, processing along clone2 branch $206_2$ can process a decision 220 to determine if the switchover point 142 has been reached and, if so, take the decision branch to receive another incoming query at step 217. At some moment in time, the switchover point 142 is reached and the "Yes" branch of decision 220 is taken. At that point, clone2 can enter into the full data dictionary processing regime such that queries are thenceforth satisfied using the data dictionary results of clone1 rather than using the historical data query facility of clone2. As earlier mentioned, there are cases when the historical data query processor might pend before completion (e.g., without returning results to the requestor) until the moment of switchover. At or after the moment of switchover clone2 might pass the pending query to a clone1 process that then uses the full data dictionary to return query results to the requestor.

After the switchover point 142 has been reached, the fork block is joined (e.g., since the full data dictionary has been completed) such that henceforth (e.g., at step 221), queries can be processed in a manner that delivers the response time differential as shown and described pertaining to the full data dictionary processing regime of FIG. 1C.

Returning to the forking operations pertaining to fork block 203, the fork block might fork off more than two clones. Use of three or more clones running concurrently offers several additional high-performance functions, some of which are shown and described as pertaining to FIG. 3.

Figure 3:
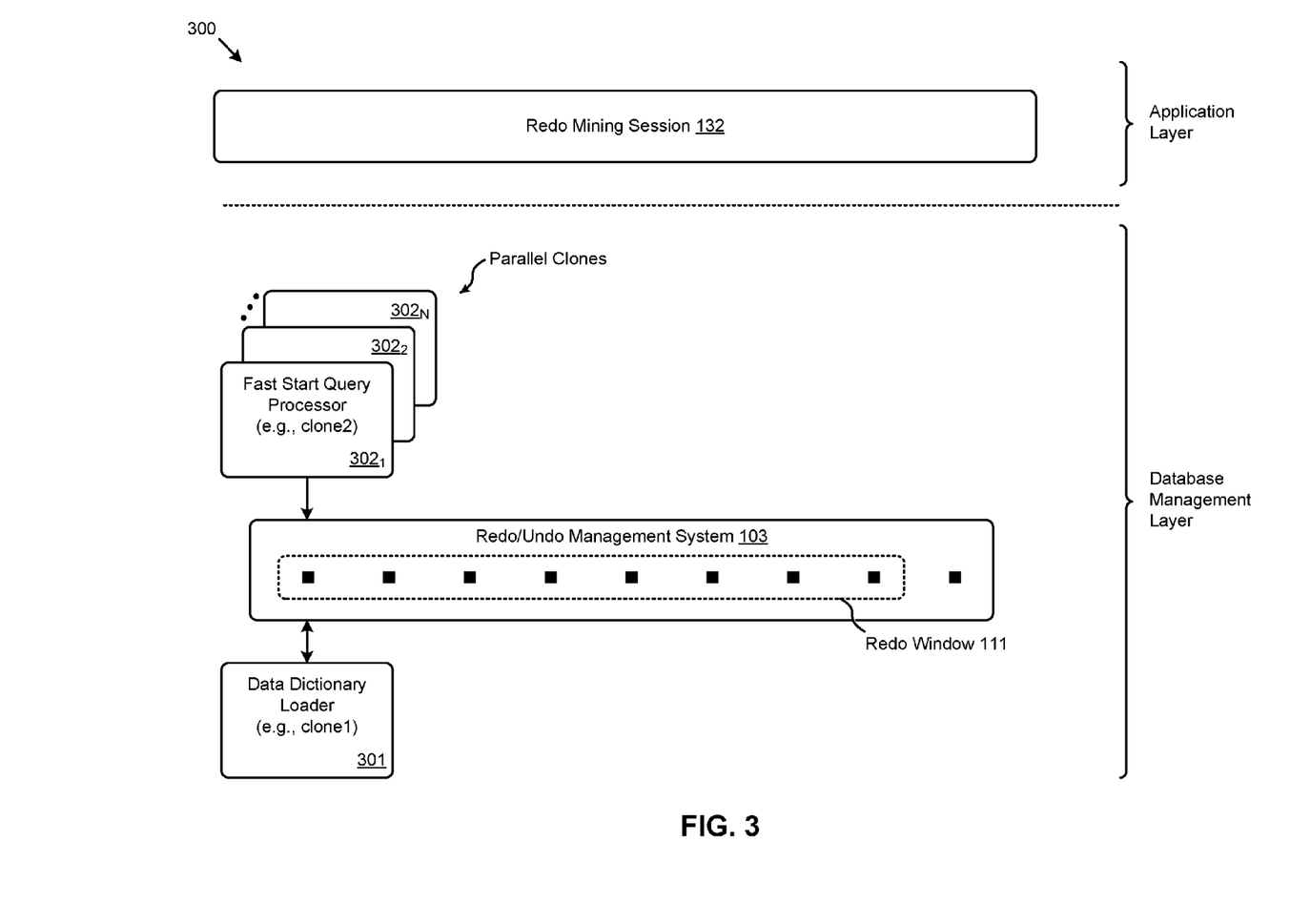
FIG. 3 is a progression chart showing three or more clones that perform in two different query processing regimes over a series of redo records, according to an embodiment.

FIG. 3 is a progression chart 300 showing three or more clones that perform in two different query processing regimes over a series of redo records. As an option, one or more variations of progression chart 300 or any aspect thereof may be implemented in the context of the architecture and functionality of the embodiments described herein. The progression chart 300 or any aspect thereof may be implemented in any environment.

As shown in the foregoing FIG. 2, and specifically as pertaining to the loop of clone2, during processing of queries under the historical data query processing regime 144, many queries can be processed before reaching the switchover point 142. Such queries can be processed sequentially, or can be processed in parallel using still further clones of the aforementioned process code base that are configured as instances of processing entities (e.g., fast start query processor $302_1$, fast start query processor $302_2$, ..., fast start query processor $302_N$). Any number of such processing entities can be invoked so as to serve multiple incoming queries in parallel. Moreover, any instance of a fast start query processor can process queries pertaining to any point in time that is covered by the redo window 111.

As discussed hereinabove the determination if a switchover should be performed, and/or if results for a respective query are available to be returned, can be performed within the logic of either or both of the forked clones. Alternatively, during processing of queries by the forked clones (e.g., data dictionary loader 301, fast start query processor $302_1$, fast start query processor $302_2$, ..., fast start query processor $302_N$), one or more monitoring routines can run concurrently (e.g., as a separate process, or as a separate thread) and can at any moment in time determine if results for a respective query are available to be returned. In some cases, the monitoring routines might initiate termination of a fast start clone.

Figure 4:
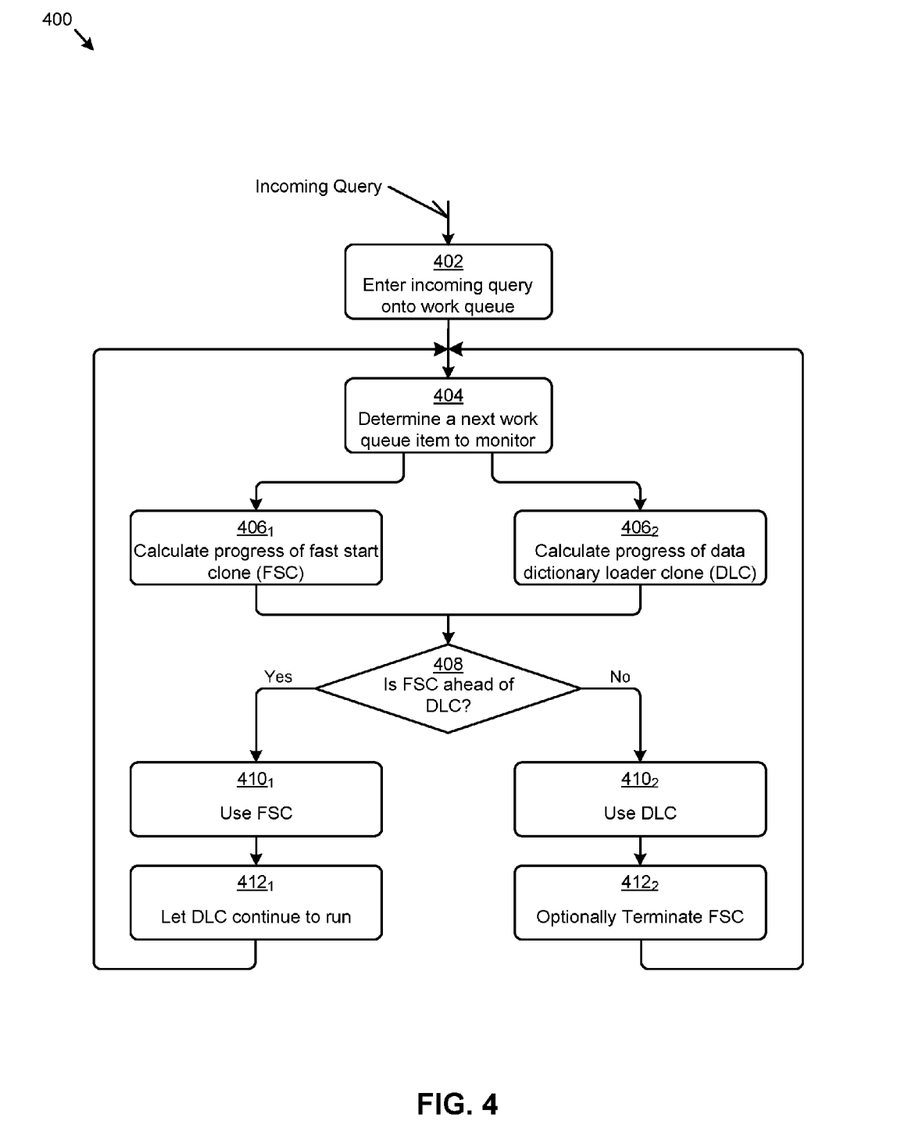
FIG. 4 depicts a monitoring technique showing real-time selection of one of two different query processing techniques based on a real-time progress calculation, according to an embodiment.

FIG. 4 depicts a monitoring technique 400 showing real-time selection of one of two different query processing regimes based on a real-time progress calculation. As an option, one or more variations of monitoring technique 400 or any aspect thereof may be implemented in the context of the architecture and functionality of the embodiments described herein. The monitoring technique 400 or any aspect thereof may be implemented in any environment.

As shown in FIG. 4, an incoming query might be received at any moment in time. At step 402, such an incoming query is entered into a work queue. The shown monitoring technique 400 examines the work queue at step 404 so as to determine a next work queue item to monitor. Monitoring can comprise calculating progress of a fast start clone (e.g., at step $406_1$) and also calculating progress of the dictionary loader clone (e.g., at step $406_2$). The shown decision 408 relies on such calculations, and if the progress of the fast start clone is farther ahead than the progress of dictionary loader, then the "YES" branch of decision 408 is taken. In this branch, results from the fast start clone are used (at step $410_1$).

Real-time Progress Calculations to Use a Partially Populated Data Dictionary

The dictionary loader clone is allowed to continue to run (at step $412_1$) even though the results of the fast start clone are available before the availability of results from dictionary loader clone. On the other hand, if the progress of dictionary loader clone is farther along than the progress of the fast start clone, then the "NO" branch of decision 408 is taken. In this branch, results from dictionary loader clone are used (at step $410_2$). In some scenarios, the fast start clone can be optionally terminated (at step $412_2$) so as to release system resources. If terminated, another incoming query (e.g., at step 402) might invoke a new fast start clone instance. In certain cases, cache data can be accessed by the fast start clone instance so as to facilitate rapid start-up of the new fast start clone instance. If the fast start clone is not terminated, in some embodiments, it can be used to process new incoming queries.

In some embodiments, decision 408 is based at least in part on comparison of first sequence identifier pertaining to the clone1 to a second sequence identifier pertaining to the clone2. More specifically, if the first sequence identifier reported by clone1 refers to a time that is later than the second sequence identifier reported by clone2, then clone1 can be used to return results to the incoming query. The sequence identifiers can be based on a timestamp or based on system change number.

Tests pertaining to decision 408 can be done at any moment in time, and by any process or thread. Strictly as one example, such tests can be performed by clone2 each time it encounters a DDL transaction in the redo log. Tests pertaining to decision 408 can operate over any metric or metrics that indicate a sequence of transaction and/or a point in time.

As discussed heretofore, each clone mines over the same redo stream. Thus, based on the SCN at which a clone is currently mining, a test can be devised to see if clone2 is processing a DDL that commits at an SCN value that is earlier than the SCN of the last DDL mined by clone1. When clone2 determines that clone1 has passed it, clone2 can switch from the regime using the historical data query facility to a regime using data dictionary mining (e.g., since clone1 has populated data dictionary at least up to the point to which clone2 is processing).

DMLs Used as Proxy for DDLs

In some cases the redo log may include long periods where there are no DDLs in the redo log. To reduce the likelihood that such a long period might reduce the granularity of the determinations pertaining to decision 408, certain DMLs can be treated as proxies for DDLs so as to increase the likelihood that decision 408 will be at least periodically executed as the redo log is processed. In one embodiment, all clones share a common mapping or algorithm so as to assign a particular DML type to be treated as a DDL. Strictly as one example, a mapping or algorithm might return the DML type of "the first-encountered transaction to commit in a newly opened redo log" as a DML to be treated as a DDL. In another embodiment, a DML type that is to be treated as a DDL is determined by random selection.

In some embodiments, multiple slave loader sessions are invoked and the multiple slave loader sessions can deliver mined redo results to a master loader. In many such cases, overall system throughput is improved through exploitation of parallelism in processing. For example, one or more clones might run, rapidly applying DDLs to the mining data dictionary while another clone delivers change records to the mining client application.

Example Variations

Some embodiments implement resilience techniques. For example, even if access to the redo log is slow or interrupted, both the historical data query processes and the data dictionary builder processes remain active, and can continue from the point of interruption and run to completion (e.g., to switchover point 142).

The aforementioned process code base include auto detection and observation of a processing mode (e.g., to detect and observe processing as a DSC or as an FSC. This allows for both upstream use (e.g., when the mining database is the same as the source database) as well as downstream use (e.g., when the mining database is not the source database). The aforementioned mechanisms allow for its use on traditional on-premises databases as well as cloud-based and/or multi-tenant databases.

DDL Tracking Support

DDL tracking enables tracking structural changes made to a particular database object, such as adding or dropping columns from a table. Some embodiments include DDL tracking support for on-demand multi-version denormalized data dictionaries when running in the first regime as well when running in the second regime (see FIG. 1C). Moreover, the historical data query facility can be used to establish metadata that is sufficient to bootstrap the aforementioned DDL tracking. More particularly, the historical data query facility can make queries to the source database's data dictionary to obtain object numbers pertaining to the database's data dictionary tables. Using the results of such queries, the historical data query facility is able to identify DDL transactions. In this and other embodiments, aspects of the DDL transactions are used for several purposes: (1) the historical data query facility uses DDL transactions so as to perform tests (e.g., using transaction sequence numbers of the DDL transactions) so as to make a choice at decision 408, and (2) when a DDL transaction is seen, the metadata state of the subject object is captured into a denormalized cache.

Further aspects of caching object metadata and general approaches to making and using a demormalized cache are disclosed in U.S. Pat. No. 7,236,993 titled "ON-DEMAND MULTI-VERSION DENORMALIZED DATA DICTIONARY TO SUPPORT LOG-BASED APPLICATIONS", the contents of which is hereby incorporated by reference in its entirety.

Caching

Some embodiments implement caching such that, for example, when a second or Nth query that needs the same data dictionary metadata or portion thereof that had been earlier processed, the cached results can be used rather than reprocessing to retrieve and/or construct the needed metadata. Some such embodiments include a client facing metadata delivery application programming interface that offers access to any forms of the calculated metadata.

Additional Embodiments of the Disclosure

Additional Practical Application Examples

Figure 5:
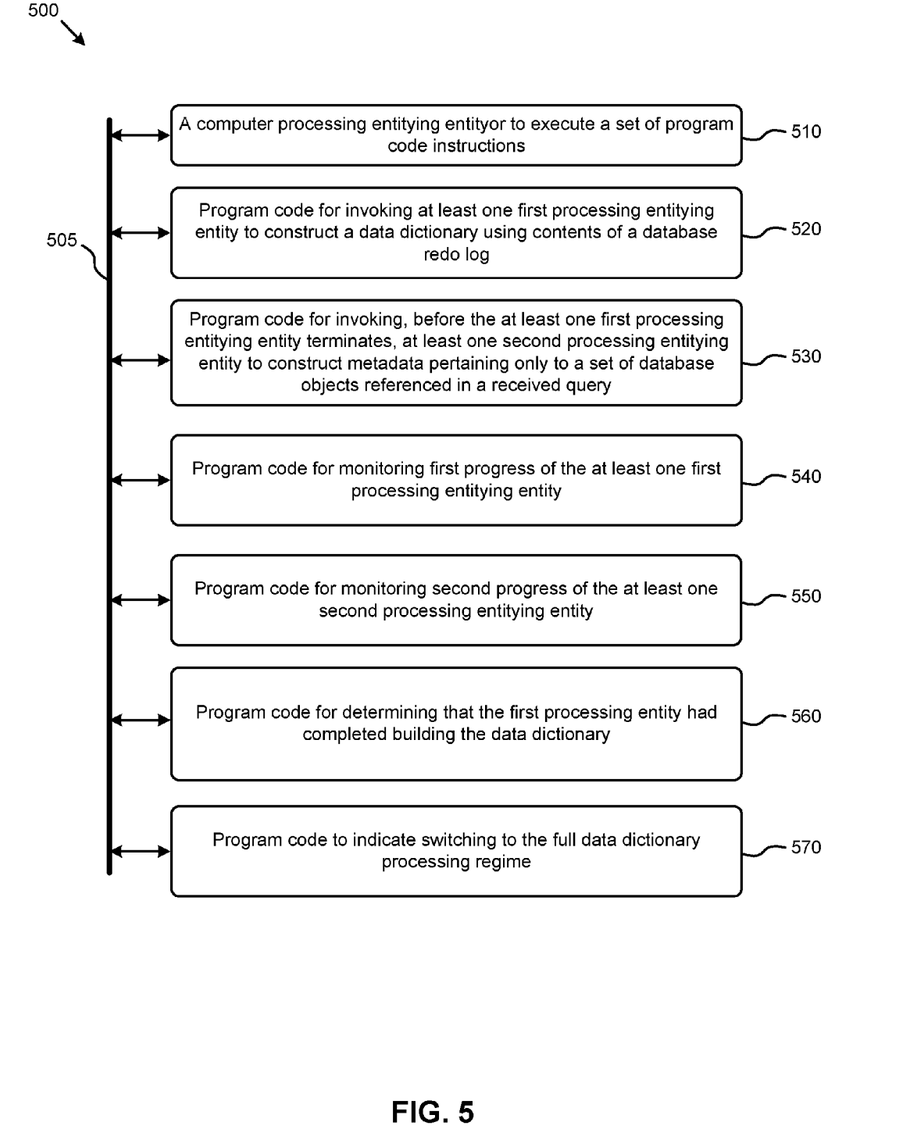
FIG. 5 depicts system components as arrangements of computing modules that are interconnected so as to implement certain of the herein-disclosed embodiments.

FIG. 5 depicts a system 500 as an arrangement of computing modules that are interconnected so as to operate cooperatively to implement certain of the herein-disclosed embodiments. The partitioning of system 500 is merely illustrative and other partitions are possible. As an option, the system 500 may be implemented in the context of the architecture and functionality of the embodiments described herein. Of course, however, the system 500 or any operation therein may be carried out in any desired environment. The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The shown embodiment implements a portion of a computer system, presented as system 500, comprising a computer processor to execute a set of program code instructions (module 510) and modules for accessing memory to hold program code instructions to perform: invoking at least one first processing entity to construct a data dictionary using contents of a database redo log (module 520); invoking, before the at least one first processing entity terminates, at least one second processing entity to construct metadata pertaining to only a set of database objects referenced in a received query (module 530); monitoring first progress of the at least one first processing entity (module 540); monitoring second progress of the at least one second processing entity (module 550); determining that the first processing entity had completed building the data dictionary (module 560); and storing a value to indicate switching to the full data dictionary processing regime using the full data dictionary loader of the log data query processor (module 570).

Variations of the foregoing may include more or fewer of the shown modules and variations may perform more or fewer (or different) steps, and/or may use data elements in more, or in fewer or different operations.

System Architecture Overview

Additional System Architecture Examples

Figure 6:
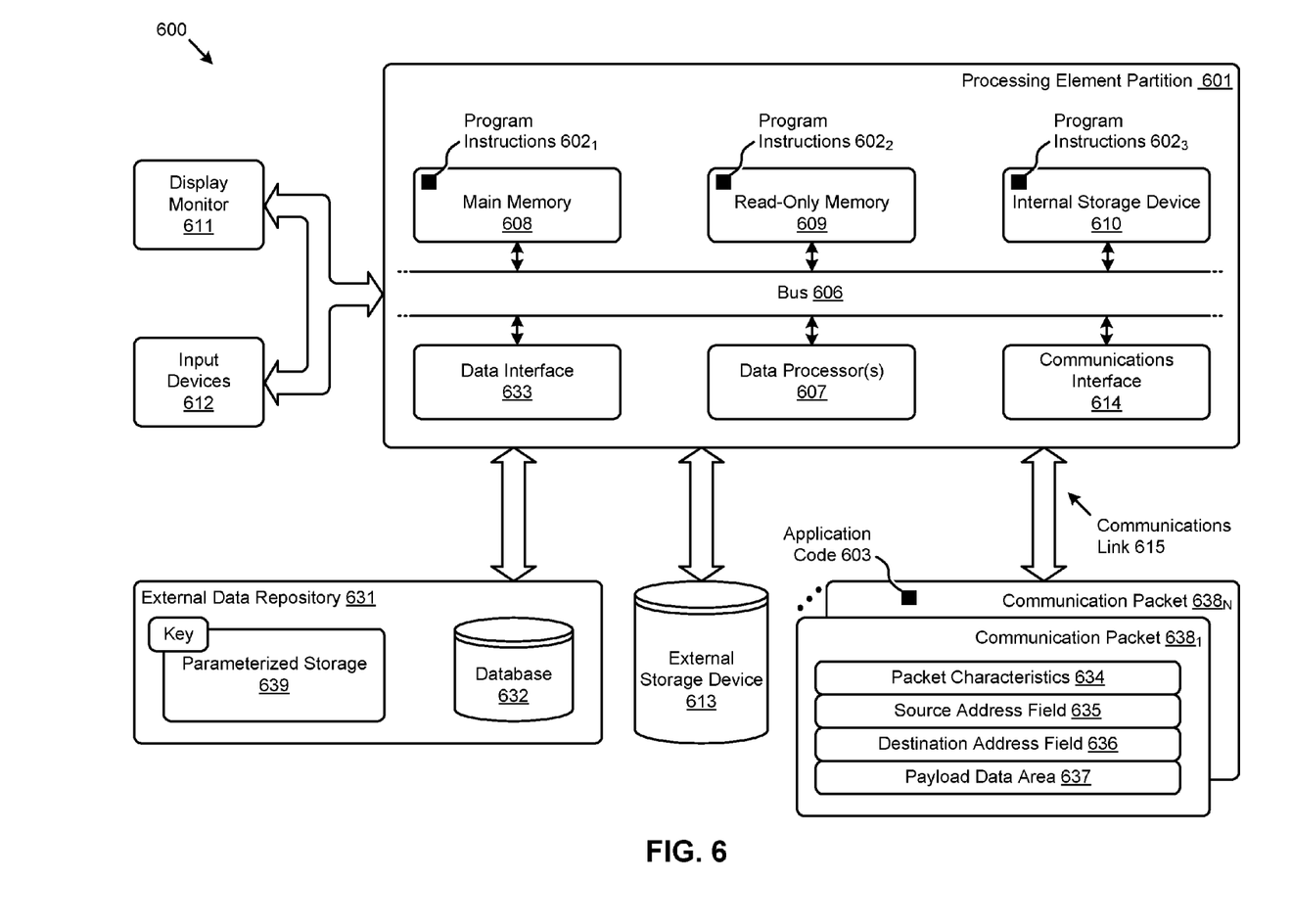
FIG. 6 depicts exemplary architectures of components suitable for implementing embodiments of the present disclosure and/or for use in the herein-described environments.

FIG. 6 depicts a block diagram of an instance of a computer system 600 suitable for implementing embodiments of the present disclosure. Computer system 600 includes a bus 606 or other communication mechanism for communicating information. The bus interconnects subsystems and devices such as a CPU, or a multi-core CPU (e.g., data processors 607), a system memory (e.g., main memory 608, or an area of random access memory), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. The shown computer system 600 further comprises a display 611 (e.g., CRT or LCD), various input devices 612 (e.g., keyboard, cursor control), and an external data repository 631.

According to an embodiment of the disclosure, computer system 600 performs specific operations by data processors 607 executing one or more sequences of one or more program code instructions contained in a memory. Such instructions (e.g., program instructions $602_1$, program instructions $602_2$, program instructions $602_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 600 performs specific networking operations using one or more instances of communications interface 614. Instances of the communications interface 614 may comprise one or more networking ports that are configurable (e.g., pertaining to speed, protocol, physical layer characteristics, media access characteristics, etc.) and any particular instance of the communications interface 614 or port thereto can be configured differently from any other particular instance. Portions of a communication protocol can be carried out in whole or in part by any instance of the communications interface 614, and data (e.g., packets, data structures, bit fields, etc.) can be positioned in storage locations within communications interface 614, or within system memory, and such data can be accessed (e.g., using random access addressing, or using direct memory access (DMA), etc.) by devices such as data processors 607.

The communications link 615 can be configured to transmit (e.g., send, receive, signal, etc.) any types of communications packets (e.g., communications packet $638_1$, . . . , communications packet $638_N$) comprising any organization of data items. The data items can comprise a payload data area 637, a destination address field 636 (e.g., a destination IP address), a source address field 635 (e.g., a source IP address), and can include various encodings or formatting of bit fields to populate the shown packet characteristics 634. In some cases the packet characteristics include a version identifier, a packet or payload length, a traffic class, a flow label, etc. In some cases the payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processors 607 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of the computer system 600. According to certain embodiments of the disclosure, two or more instances of computer system 600 coupled by a communications link 615 (e.g., LAN, PTSN, or wireless network) may perform the sequence of instructions required to practice embodiments of the disclosure using two or more instances of components of computer system 600.

The computer system 600 may transmit and receive messages such as data and/or instructions organized into a data structure (e.g., communications packets). The data structure can include program instructions (e.g., application code 603), communicated through communications link 615 and communications interface 614. Received program code may be executed by data processors 607 as it is received and/or stored in the shown storage device, or in or upon any other non-volatile storage for later execution. Computer system 600 may communicate through a data interface 633 to a database 632 on an external data repository 631. Data items in a database can be accessed using a primary key (e.g., a relational database primary key).

The processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of systems that perform automatic overrides of database statistics gathering commands.

Various implementations of the database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of performing automatic overrides of database statistics gathering commands). Such files or records can be brought into and/or stored in volatile or non-volatile memory.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for processing a query to return data from a database redo stream of a database system, the method comprising:
    receiving, at the database system, a query that is to be executed against the redo stream of the database system, wherein the query corresponds to a prior logical state of the database system;
    determining that a data dictionary constructed from the redo stream of the database system is not complete through a time corresponding to the prior logical state of the database system, wherein at least one first processing entity loads metadata into the data dictionary by processing contents of the redo stream with a first metadata processing technique;
    invoking, before the at least one first processing entity completes construction of the data dictionary for the query, at least one second processing entity to construct object metadata from the redo stream with a second metadata processing technique, wherein the object metadata pertains to a set of database objects referenced in the query; and
    returning results of the query to a requestor using at least results from the second processing entity, while the data dictionary is still not complete and the object metadata constructed using the second metadata processing technique is used to satisfy the query against the redo stream.

2. The method of claim 1, further comprising determining a switchover point when the data dictionary constructed from the redo stream of the database system is complete.

3. The method of claim 1, wherein the first processing entity comprises a data dictionary loader.

4. The method of claim 1, wherein the second processing entity comprises a historical data query processor.

5. The method of claim 4, further comprising invoking a third processing entity that comprises a second historical data query processor.

6. The method of claim 1, wherein at least some entries of the database redo stream comprise a sequence identifier.

7. The method of claim 6, wherein the sequence identifier is derived from an SCN of a DDL.

8. The method of claim 6, wherein the sequence identifier is derived from an SCN of a DML.

9. The method of claim 8, wherein the sequence identifier of the DML is based at least in part on a selected DML type.

10. The method of claim 1, wherein the second processing entity is terminated when a first sequence identifier reported by the first processing entity refers to a time that is later than a second sequence identifier reported by the second processing entity.

11. The method of claim 1, wherein the second processing entity switches its mode when a first sequence identifier reported by the first processing entity refers to a time that is later than a second sequence identifier reported by the second processing entity.

12. A non-transitory computer readable medium, the non-transitory computer readable medium having stored thereon a sequence of instructions which, when stored in memory and executed by one or more processors causes the one or more processors to perform a set of acts of processing a query to return data from a database redo stream of a database system, the set of acts comprising:
    receiving, at the database system, a query that is to be executed against the redo stream of the database system, wherein the query corresponds to a prior logical state of the database system;
    determining that a data dictionary constructed from the redo stream of the database system is not complete through a time corresponding to the prior logical state of the database system, wherein at least one first processing entity loads metadata into the data dictionary by processing contents of the redo stream;
    invoking, before the at least one first processing entity completes construction of the data dictionary for the query, at least one second processing entity to construct object metadata from the redo stream with a second metadata processing technique, wherein the object metadata pertains to a set of database objects referenced in the query; and
    returning results of the query to a requestor using at least results from the second processing entity, while the data dictionary is still not complete and the object metadata constructed using the second metadata processing technique is used to satisfy the query against the redo stream.

13. The non-transitory computer readable medium of claim 12, further comprising instructions which, when stored in the memory and executed by the one or more processors causes the one or more processors to perform the set of acts, the set of acts further comprising determining a switchover point when the data dictionary constructed from the redo stream of the database system is complete.

14. The non-transitory computer readable medium of claim 12, wherein the first processing entity comprises a data dictionary loader.

15. The non-transitory computer readable medium of claim 12, wherein the second processing entity comprises a historical data query processor.

16. The non-transitory computer readable medium of claim 15, further comprising instructions which, when stored in the memory and executed by the one or more processors causes the one or more processors to perform the set of acts, the set of acts further comprising invoking a third processing entity that comprises a second historical data query processor.

17. The non-transitory computer readable medium of claim 12, wherein at least some entries of the database redo stream comprise a sequence identifier.

18. The non-transitory computer readable medium of claim 17, wherein the sequence identifier is derived from an SCN of a DDL.

19. A system for processing a query to return data from a database redo stream of a database system, the system comprising:
a storage medium having stored thereon a sequence of instructions; and
one or more processors that execute the instructions, wherein an execution of the instructions causes the one or more processors to perform a set of acts, and the set of acts comprising,
receiving, at the database system, a query that is to be executed against the redo stream of the database system, wherein the query corresponds to a prior logical state of the database system;
determining that a data dictionary constructed from the redo stream of the database system is not complete through a time corresponding to the prior logical state of the database system, wherein at least one first processing entity loads metadata into the data dictionary by processing contents of the redo stream;
invoking, before the at least one first processing entity completes construction of the data dictionary for the query, at least one second processing entity to construct object metadata from the redo stream with a second metadata processing technique, wherein the object metadata pertains to a set of database objects referenced in the query; and
returning results of the query to a requestor using at least results from the second processing entity, while the data dictionary is still not complete and the object metadata constructed using the second metadata processing technique is used to satisfy the query against the redo stream.

20. The system of claim 19, wherein the set of acts further comprises determining a switchover point when the data dictionary constructed from the redo stream of the database system is complete.

\* \* \* \* \*

UNITED STATES PATENT AND TRADEMARK OFFICE
CERTIFICATE OF CORRECTION

PATENT NO. : 10,423,600 B2
APPLICATION NO. : 15/268008
DATED : September 24, 2019
INVENTOR(S) : Brown et al.

Page 1 of 1

It is certified that error appears in the above-identified patent and that said Letters Patent is hereby corrected as shown below:

In the Drawings

On sheet 7 of 8, in FIG. 5, under Reference Numeral 510, Line 1, delete "entityor" and insert -- entity --, therefor.

In the Specification

In Column 8, Line 44, delete "clonel" and insert -- clone1 --, therefor.

In Column 8, Line 45, delete "clonel" and insert -- clone1 --, therefor.

In Column 8, Line 47, delete "clonel" and insert -- clone1 --, therefor.

In Column 9, Line 1, delete "clonel" and insert -- clone1 --, therefor.

In Column 9, Line 13, delete "clonel" and insert -- clone1 --, therefor.

In Column 10, Line 44, delete "clonel" and insert -- clone1 --, therefor.

In Column 10, Line 46, delete "clonel" and insert -- clone1 --, therefor.

In Column 10, Line 63, delete "clonel" and insert -- clone1 --, therefor.

In Column 10, Line 66, delete "clonel" and insert -- clone1 --, therefor.

In Column 11, Line 65, delete "demormalized" and insert -- denormalized --, therefor.

In Column 14, Line 31, delete "PTSN," and insert -- PSTN, --, therefor.

Signed and Sealed this
Eighth Day of September, 2020

Andrei Iancu
*Director of the United States Patent and Trademark Office*